April 30, 1968
G. E. PETERSON
3,381,082
CABLE SPLICERS AND THE LIKE
Filed Nov. 15, 1965
2 Sheets-Sheet 1
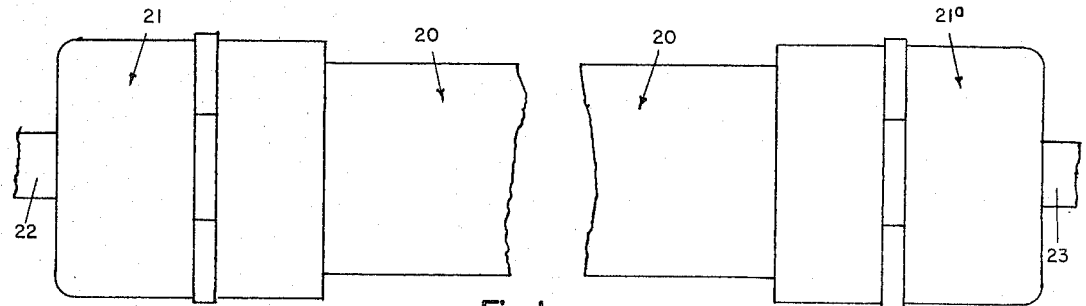
Fig. 1.
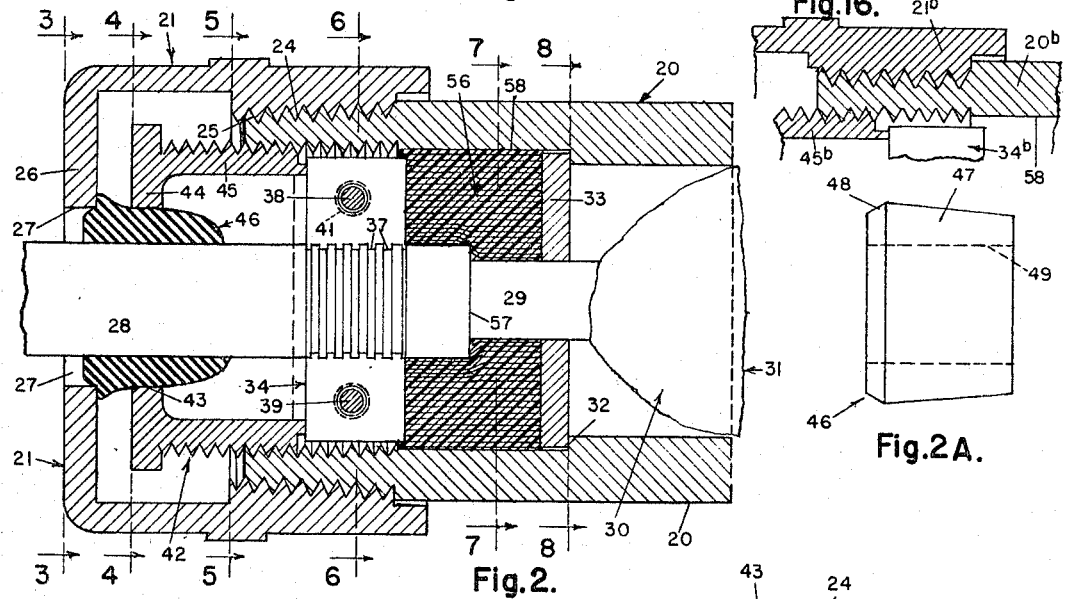
Fig. 16.
Fig. 2A.
Fig. 2.
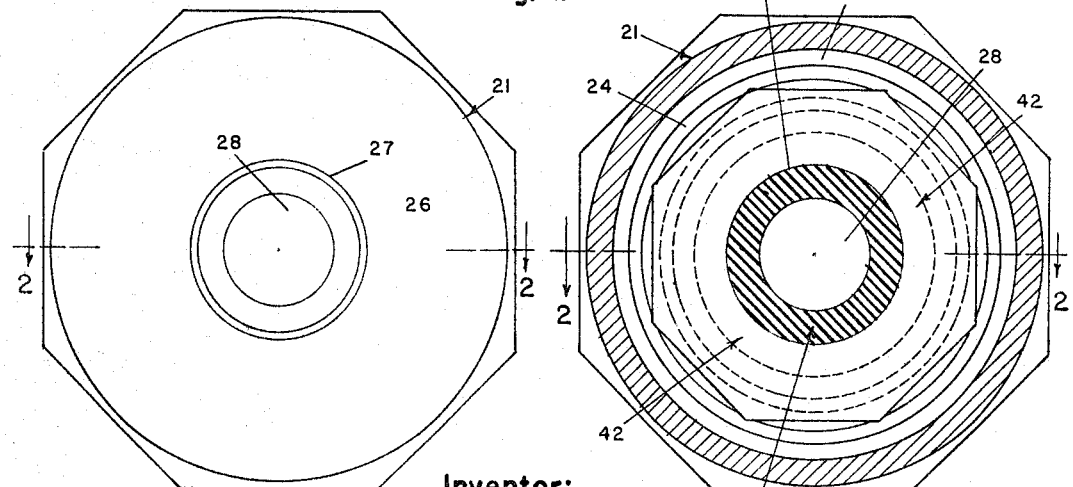
Fig. 3.
Fig. 4.
Inventor:
George E. Peterson,
by Thos. A. Downey, Atty.

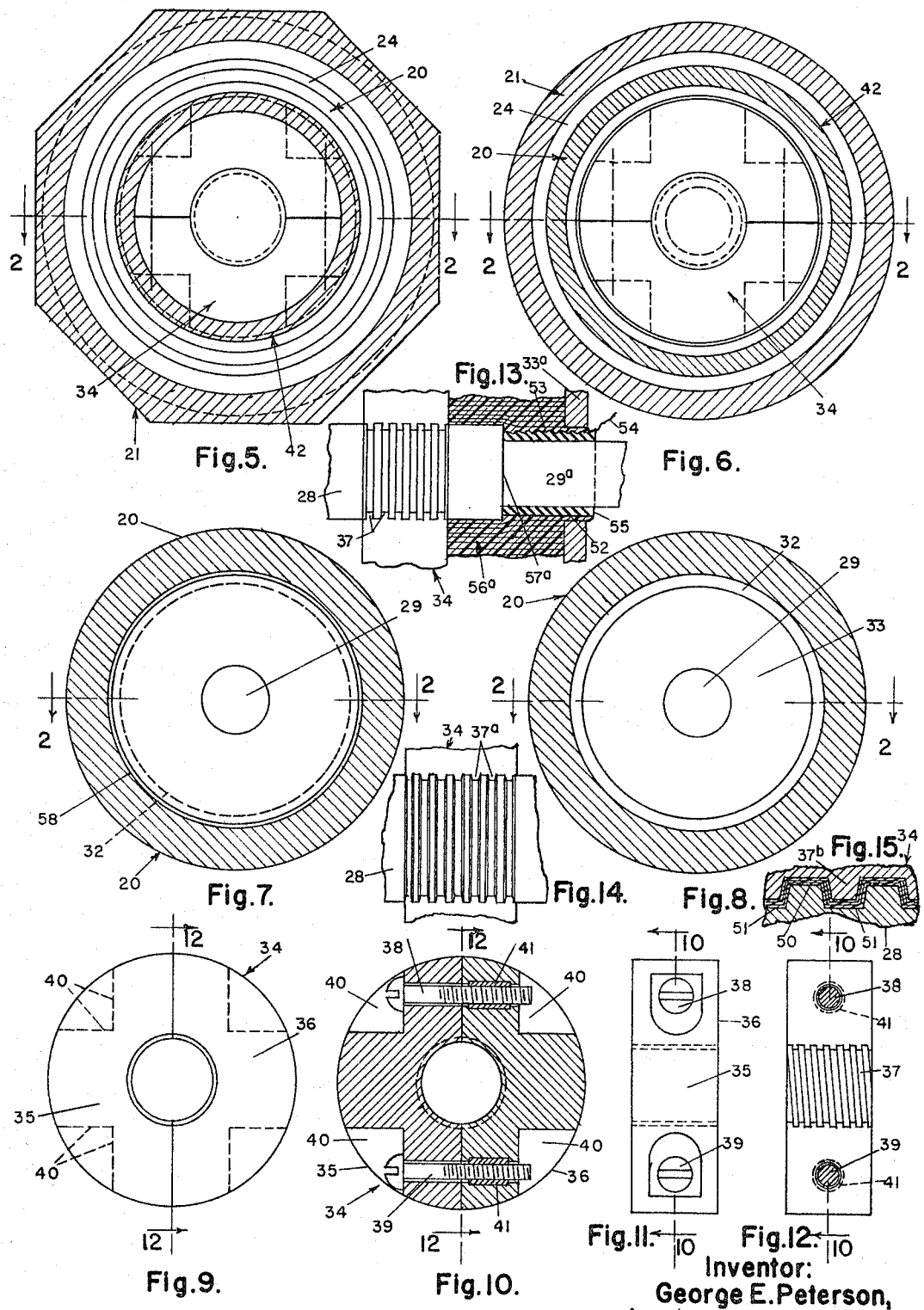

United States Patent Office 3,381,082
Patented Apr. 30, 1968

3,381,082
CABLE SPLICERS AND THE LIKE
George E. Peterson, Chicago, Ill., assignor to Communication Equipment and Engineering Company, Chicago, Ill., a corporation of Illinois
Filed Nov. 15, 1965, Ser. No. 507,736
16 Claims. (Cl. 174—93)

ABSTRACT OF THE DISCLOSURE

A cable splice unit by which the stripped end portion of the cable is encased by a plastic-like substance within a closed space, with provision for producing a strong compressive force on such substance, to drive it thoroughly into engagement with the stripped cable surfaces and with the interior surfaces of the space which encloses such substance, to produce a tight and gas proof seal against the stripped cable surface and the surface of the enclosure.

---

This invention relates to cable splicers, and the like. The splicers hereinafter to be disclosed have been designed especially to meet the rigorous and severe conditions to which such units are subjected in normal and everyday use, and to meet other even more severe and rigorous conditions sometimes imposed by severe weather and temperature conditions. The splices herein disclosed have also been designed to accommodate and meet such conditions primarily in the case of cables carrying many pairs of conductors (frequently referred to merely as "pairs"); but it will become evident that the present improvements are also useful for splicing other conductors, either power or communications, including such cables as are presently being used in connection with telecommunication systems, wherein co-axial lines are present, as well as additional, control or signalling lines.

In the case of communication lines and other lines for such uses as telecommunications, it is necessary to produce the splices between successive lengths of the cable (usually a few hundred or even thousand feet), of such construction, and in such manner that current leakages or short circuits between the numerous pairs of conductors, shall be avoided to a maximum degree. This is true not only from the standpoint of reduction of skilled labor time expended in locating and repairing the defects, as well as losses due to "down time" caused by such defects; but also to ensure most perfect transmission of the messages over each of the pairs, and avoidance of "cross-talk" between pairs. Aside from defects due to actual conductor contacts between the conductors of a pair or between conductors of proximate pairs, leakages may occur between such conductors, or between a conductor and ground, due to presence of moisture within the splicer unit. The presence of moisture within the splicer greatly magnifies troubles such as mentioned above, especially when the insulation on the conductors themselves is a paper product. The moisture, in such case, readily finds its way through the insulation, due to capillary or similar movements. It is therefore imperative that maximum precautions be taken to void presence of moisture within the splicer at the time of sealing the splice; and above all, to provide a structure which shall, of itself be practically sure against incursion of the moisture through elements of the splicer. Such incursions are due largely to successive changes in temperature conditions inside and outside of the splice, such changes producing "breathing" which carries the moisture into the enclosed space of the splice, where condensation thereof takes place. Such conditions are aggravated proportionally to the lapse of time since the splice was completed, as well as the nature and severity of the weather to which the splice is exposed.

It will be understood, however, that the features of invention hereinafter to be disclosed are not limited to splices made and existing in lines overhead, but are also useful in the case of underground or buried lines and cables. In such cases the presence of natural current flows through the ground or other formation may greatly aggravate the deterioration of the splicer, when the cable is metal sheathed, and when the splicers are also formed of metal, soldered or similarly sealed to the proximate cable sheaths. In such cases the presence of different metals in contact with each other (such as the lead sheath of the cable and the lead sleeve over the spliced lines, contra the solder, which is usually a low melting alloy of two or more metals), will cause production of local currents at the soldered joints, especially when water is present, especially water carrying one or more minerals in solution.

The recent introduction of cable sheaths formed of material other than metal (e.g., various plastic materials), largely eliminates the foregoing objectionable effects due to the use of metal sheaths; but it is also highly desirable to form of splicer itself of such non-metallic materials, thus completely avoiding the electrolytic conditions above referred to. It is a prime object of the present invention to provide a structure of such design and construction that all portions thereof, may be formed of synthetic or plastic, non-metallic materials, thus avoiding the objections already referred to in the case of metal splicers; and in this connection to also provide such a splicer structure which may, if desired, be used in the joining together of proximate ends of lead or other metallic sheathed cables, the elements of the splicer itself being completely devoid of any metal which could possibly produce or enter into an electrolytic action.

The following conditions are also pertinent to a full understanding of the structural features and their relation to each other, which structures are to be hereinafter disclosed:

The larger telephone lines cables (carrying one hundred of several hundreds pairs) are conventionally provided with an inner and an outer sheath or covering. The inner sheath may be of paper or plastic sheeting—the outer sheath is formed of material capable of withstanding the elements and physical encounters to which the cable may be subjected, including snow, sleet, ice, hail, etc. Such outer sheathing is thus intended to protect the communication carrying lines against damage by physical encounters of severe degree. It sometimes happens, however, that such outer sheath is pierced, thus providing an entrance for water and moisture generally to find its way at least through such outer sheath, and to the inner sheath, which is usually not of as great physical strength as the outer sheath, but is designed primarily to prevent entrance of moisture into the inner pairs (or other conductors) carrying core of the cable. However, it seldom happens that such inner sheath is itself pierced, so it may retain its intended moisture proof characteristic. But moisture, admitted through the piercing of the outer sheath, may arrive at the inner sheath, and then gradually move, largely by capillary action, lengthwise along the surface of the inner sheath to a location of lower pressure; in other words such intruded moisture in time gains a considerable volume, distributed along the outer surface of the inner sheath. Furthermore, if in time such inner sheath loses much or even some of its moisture resisting characteristic, it too may become the path for radial movement of such moisture inwardly, to the core—the location of the conductors.

It is a prime objective of the present invention to provide a splicer structure so constituted that when it is locked into its final place and condition, to protect the junctions of the ends of the cable conductors together, two seals of high moisture resisting ability are produced. The first of these is a positive seal against the inner sheath at a location where the outer sheath has been stripped from the end portion of the cable, to prepare such end portion for connection of its conductors to the proximate and companion end portion of the cable to which the splice is being made. This inner seal is so constituted that it also reaches backwardly along the cable whose inner sheath has been thus exposed, and over the outer surface of the outer sheath, to thus positively seal off the circular line of joinder between the inner and outer sheaths, thus preventing any moisture which may have crept lengthwise of the cable along the surface of the inner sheath, from gaining access to the space within the splicer unit wherein the numerous codnuctors are connected to their counterparts of the cable length to which junction is being made.

The nature and composition, and the characteristics of this inner sheath seal will be fully disclosed hereinafter.

The other seal of the two already referred to, is a physical seal and support for the arriving section of the cable at the location of the splicer, to perform two functions. One such function comprises provision of a tight seal against the outer sheath of the arriving cable—the other such function resides in the provision of a physical support for the body of the cable, resisting lateral displacement of the cable, as by bending, except at the location of such seal, and thus prevetning any untoward bending or lateral shift of the inner sheath at the location of the first defined seal. Thus such first defined seal is effectively protected against damage which it might after a considerable interval suffer, had such protection against lateral shift not been provided. Thus, too, the swaying and swinging of the cable, supported by connection to the adjacent poles or other supports, may not result in a gradual grinding or deforming of the inner sheath seal, which might, in a considerable interval, result in impairment of the perfection of that seal.

A further object of the invention resides in the provision of a structure which lends itself admirably to production of many or all of its elements (with the exception of the sealing elements themselves used for production of the actual seals), from moulded plastics or other readily formed and produced materials, especially from materials of non-conductor quality. In this connection it is a further object to provide a design of the various elements, such that they may be produced to the desired close tolerances required of the splicer, and substantially without need of machining or other finishing operations.

A further and important object of the invention resides in the provision of a splicer of construction such that it will make possible the continued existence of a continuous air conducting duct through the successive cables and the splicers by which they are successively connected in series with each other. This feature will be better understood from the following brief explanatory statement:

Many multiple pair cables are placed under air pressure to aid in preventing incursion of moisture to the conductors, even when through unusual happenings leaks may occur at positions intermediate between successive splices—that is, along the length of the cable itself. Such air pressure system, when used, necessarily includes provision for maintaining a supply of the compressed air (usually of a few pounds above atmospheric), input at successive locations along the line of cable. Such inputs may be many miles apart. Any even minor leakage along such a length of cable, will necessarily result in a slow, but significant flow of the air from the proximate input stations, towards the point of loss; but it is evident that such flow, small though it may be, requires flow through one or many of the splicers present between such points of input. Accordingly, it is needful that the seals which are provided at the points of junction of the proximate cable ends with a splicer, be of such form, and so produced, that they will not hinder the free exit of the moving air from one cable end, into the body of the splicer, and from the opposite end of the splicer, into the proximate end of the next cable section. It will be understood, that such slow flow or movement of the air lengthwise of the line of cable is possible through the inner core of the cable, within the inner sheath, since such core, formed of the numerous pairs of lines, is not solid to the extent sufficient to forbid such air flow lengthwise. To meet this condition, the seals against the inner sheath of the cable, do not extend down into the pairs of lines themselves, but do effectively produce seals between the inner cable sheaths and the splicer itself. This condition will be fully revealed hereinafter.

It is also customary to provide a thin shield of conductor on the outside surface of the inner sheath, comprising a portion of such inner sheath, and within the outer sheath, such conductor serving to carry stray currents which may leak into the cable under accident or otherwise, and also to avoid build-up of improper potentials proximate to the enclosed pairs of conductors. It is then necessary to connect such shields of the successive cable sections together, through the splicers themselves. I have made provision for enabling such shields to be readily connected together through the splicer hereinafter disclosed, without detracting from the effectiveness of the seals themselves.

Other objects and uses of the invention will appear from a detailed description of the same, which consists in the features of construction and combinations of parts hereinafter described and claimed.

Another feature of the invention relates to the provision of a structure in which the sealing elements are of such characteristics, as respects their adhesiveness to other proximate elements of the splicer that when necessary one of the splicers may be readily opened and dismantled to the extent necessary to repair a broken pair, or a pair which may have become leaky or cross-connected to adjacent pairs, or to repair other damage, while the splicer remains opened; with subsequent ability to restore such splicer to service under its original sealing ability; all without substantial damage to such splicer itself, and with need of a minimum loss of sealing or other materials, during such special operation. The ability to effect such emergency operations is enhanced by the nature of the sealing material itself, including as one of its characteristics, substantial non-adhesiveness thereof to the plastic formed shell and caps and other elements of structure from which they are moulded.

In the drawings:

FIGURE 1 shows an outside surface view of a splicer embodying the features of my present invention; the central portion of such splicer being broken away, to shorten the figure; and in this figure the entering portions of the companion cable lengths joined together with the splicer, are shown, broken off;

FIGURE 2 shows a detailed longitudinal central section of the sealing and related elements at one end of the splicer shown in FIGURE 1, a portion of the bag enclosing the connected-together end portions of the pairs of conductors, also being shown in elevation within the tubular section of the splicer unit;

FIGURE 2A shows an outside view of the block of rubber or other suitable material which is used for producing the second seal and support against the outer sheath of the proximate cable;

FIGURE 3 shows a left-hand end view of the splicer shown in FIGURE 1, and in other figures;

FIGURES 4, 5, 6, 7 and 8 show cross-sections taken on the lines 4—4, 5—5, 6—6, 7—7 and 8—8, respectively, of FIGURE 2;

FIGURE 9 shows a face view of the presser block which grips the surface of the outer sheath firmly and in sealing manner when set onto and secured onto the outer sheath, and which presser block is afterwards forced strongly against the deformable, high interior molecular resistance characteristic adherent material, by which the seal against the surface of the inner sheath and against the end porton of the stripped-off outer sheath, is produced in simple manner;

FIGURE 10 shows a central planar section through the unit shown in FIGURE 9, being sectioned on a plane parallel to the face of the unit;

FIGURE 11 shows an edge view of the unit shown in FIGURES 9 and 10; and this figure shows the screw-threaded bolts by which the two halves of the unit are gripped tightly against the surface of the outer sheath; the degree of such gripping engagement being limited by the structure of the halves, to avoid damage to the outer sheath, such as by breaking the same and thus allowing ingress of moisture through the sheath;

FIGURE 12 shows a central cross-view corresponding to the edge view shown in FIGURE 11; one of the two companion parts of the clamp having been removed from the other by cutting through the connecting screws;

FIGURE 13 shows a fragmentary longitudinal section through another embodiment of my invention at the location of the first sealing location, wherein the stripped inner portion of the cable has been stripped down to the surface of the shield which provides a continuous conductor from the cable length, through the splicer to the proximate cable length, and shows the primary sealing element engaged with the inner cable section at such location;

FIGURE 14 shows the engagement of the gripping element with the outer cable surface, when such gripping element is provided with non-square engagement elements of circular form;

FIGURE 15 shows a fragmentary section through a portion of the gripping element with the cable surface, when it is desired to provide an intermediate tape element between the gripping element and the cable surface, to take up for oversize of the internal diameter of the gripping element over the exterior size of the cable, while ensuring desired gripping between the parts; and FIGURE 16 shows a fragmentary section through straight threading engagement between the end cap and the tubular element.

FIGURES 9, 10, 11, 12, 14 and 15 are on larger scale then other figures of the drawings.

Referring to the drawings, in FIGURE 1 the splicer is shown shortened by cutting away its central section, but both of its end portions are shown. These are identical in structure, so that illustration and description of one will suffice. The central portion of the splicer comprises a tubular element 20, of length and internal diameter to accommodate the splices of the numerous pairs of conductors carried by the cable. The ends of such tubular element are closed by the caps 21 and 21ᵃ whose floors are centrally provided with openings of size to pass the proximate cable portions 22 and 23, together with a sealing element, presently to be disclosed. Conveniently, the attachment of each cap to the tubular element comprises a threaded connection, which may comprise straight (uniform pitch diameter) threading, or, as shown in the drawings, of taper form.

Referring next to FIGURE 2 and various sections thereof, the end portion of the tubular element is there shown as of taper form, 24, the cap 21 being provided with a companion taper thread 25 so that firm engagement between the cap and the end of the tubular element may be produced conventionally. The floor 26 of the cap is provided with the central cable opening 27, passing the cable end portion to the interior of the structure. The cable end portion thus passed through such opening 27 is of full diameter, including the outer sheath of the cable. Such outer sheath is stripped from the end of the cable to expose the inner sheath 29 for a distance; and at the end of such stripped portion the conductor pairs are exposed and splayed out as shown at 30, for connection to their counterparts of the succeeding cable which enters the splicer through the opposite or right-hand end cap 21ᵃ (not shown in FIGURE 2). Usually a wrapping of tape or other cover is provided around the splices of the pairs according to present conventional practise. The details of such operations and structures comprise no part of the present invention, and thus require no further detailed description here. However, it is noted that when the individual pairs have been connected to their counterparts of the opposite cable end, line for line, a bundle of some size is produced, as shown at 31. The internal diameter of the tubular element 20 is sufficient to accommodate such bundle according to the size of the cable, and the number of pairs spliced.

The tubular element is shouldered as shown at 32; and an abutment disk 33 is set over the end portion of the cable during the assembling operation sequence. In FIGURE 2 the end portion of the cable is shown as stripped to a reduced diameter, and the opening in the disk 33 is of size to accommodate such reduced diameter. In the showing of FIGURE 13, presently to be described in detail, being an alternative embodiment, the stripping of the end portion of the cable is proper in amount to allow for a somewhat different treatment of the parts, than that treatment shown in FIGURE 2. Accordingly, the opening in the disk 33ᵃ shown in FIGURE 13 is of size different from that shown in FIGURE 2. In each case the disk takes its seat against the shoulder of such abutment 32. During the sealing operations presently to be explained, a heavy pressure is exerted against such disk and shoulder by inwardly produced force, which force is however, internally absorbed by the structure. To this end the following structures are provided:

A clamp unit 34, preferably comprising two semi-circular sections 35 and 36 (see FIGURES 9, 10, 11 and 12), is set onto the unstripped portion of the cable, as shown in FIGURE 2, and such unit is then clamped onto the outer cable sheath in the following manner; the internal diameter of the combined central opening of the two sections when brought together is a tight fit onto the unstripped cable surface, or is even slightly less than the diameter of such cable surface. Such semi-circular cable receiving openings are provided with inwardly extending ribs 37, of slightly less diameter (semi-circular) than the valleys between such ribs. Accordingly, by forcing each semi-circular element, 35 or 36 as the case may be, onto the cable, the ribs will force the yieldable cable sheath (whether of lead or other metal, or of a plastic composition), to become indented to receive the ribs, thus producing circular (or screw-threaded) engagement between the outer sheath of the cable and the semi-circular elements, now brought close together into a substantially circular unit 34. Thus the clamp unit is firmly gripped to the outer sheath of the cable to prevent endwise slip between the cable and the clamp unit, except by actual destruction of the cable sheath surface. It has been found that ample holding quality between the clamp unit and the cable is thus possible to meet requirements of the present operations.

It is also noted that such ribs 37 have been purposely designed and formed of such dimension that such ample holding quality is produced without damage to the cable sheath, such as would produce cracks or openings in the sheath through which moisture and vapors might enter the body of the cable. To these ends such ribs are preferably formed with non-sharp engaging edges so that although substantially circular embedments of the ribs into the surface of the cable, they are produced without actually cutting the cable sheath. Such sheath, whether of lead or other metal, or of plastic, may deform under the engaging pressure produced between the two clamp sections when drawn together.

Although the ribs shown in FIGURES 2 and 7 are of substantially square cross-section, other forms of cross-section of the ribs may be used, provided they do not present sharp edges to the sheath. Thus, in FIGURES 14 and 15 I have shown ribs of truncated angular section. These will be referred to later herein. I contemplate the use of any or all such forms of the ribs as well as other forms, provided that their sheath engaging surfaces are such that the sheath shall not be broken or pierced when used for the purposes herein intended.

It is desirable that there be assurance that when the clamp sections are assembled onto the cable, they shall be brought towards each other the proper amount to produce the desired engaging quality, without damage to the cable sheath. Reference to FIGURES 10, 11 and 12 will show the bolts or screws 38 and 39 extending between the clamp sections. These bolts or screws are received in recesses 40 formed into the two sections for convenience of design. When the clamp sections are produced of molded materials, such as plastics or the like, it is possible to include small inserts 41 into them, registering with end holes through which the bolts are extended. These inserts are interiorly threaded to receive the screw threads of the bolts, thus ensuring against tearing of the threads (if formed of plastic) by exertion of excessive tension forces by the bolts. Examination of FIGURE 10 will also show that the molding operations have caused the end surfaces of such inserts to be at least partially overlaid by the molded material, retaining the inserts more strongly against endwise shift in the clamp sections under tensions produced by tightening of the bolts.

With the clamp structures as thus disclosed it is evident that by drawing the bolts tightly, the proximate diametral surfaces of the two sections may be brought into firm engagement with each other, thus limiting the extent degree of deformation of the cable sheath surface and preventing damage thereto. The following practical conditions of installation also present themselves:

The cables in use are of widely varying external diameters, depending on the number of pairs carried by them the nature and thickness of the outer sheath, the tightness with which the core of pairs is packed, and numerous other conditions of manufacture, specifications, etc. Thus, although cables carrying specified numbers of pairs of conductors will fall generally into diameter groups, as for example, a 50 pair cable, a 100 pair cable, a 200 pair cable, each specified group having exterior diameter falling into a specified range, but varying within such range, still there exist slight differences between the diameters of cables carrying the same number of pairs. Also, practical conditions of manufacture of the splicer elements necessarily limit the number of sizes of splicer parts which may economically be produced and carried in stock. Therefore, it is necessary to produce basic parts, such as the clamp sections, to a limited number of size specifications. For example, such clamp sections may be economically produced and carried in stock for sizes varying by such increments as ¼ inch diameter of the opening between the sections when such sections have been drawn tightly together. Evidently, however, provision should also be made for compensating for cable variations within the ¼ inch steps of sizes to which the clamp sections are produced. Otherwise it may happen that when a clamp of the proper specification of size is applied to a given cable to which it is intended for use, tight clamping may not be possible, even when the two clamp sections are brought solidly together, with their diametral surfaces in contact with each other. To meet this condition, and to enable commercial production of the clamps under as few size specifications as possible I have devised the following arrangement, shown in FIGURE 15, to which reference is made.

Determination is made of the exact diameter of the cable at or adjacent to the location where the clamp is to be applied, is first made. Then one or more wraps of a thin, fine filament, plastic tape, of width substantially the same as the thickness of the clamp (axially), are applied around the cable at the location where the clamp is to be secured, such wraps being sufficient to bring the external diameter of the wrapped cable to the size for which the clamp is intended. Such fine filament tape is of high tensile strength due to the presence of the filaments formed into its body and extending lengthwise of the tape. Furthermore, such tape is very flexible, and may be readily formed, by pressure, into small depressions. Having applied the proper amount of such tape at the intended location, the clamp sections are set onto the tape, such sections now fitting the taped diameter with acceptable closeness, and the sections may now be drawn together by use of the screws. During this operation, the tape is cramped into the surface of the cable, to produce impressions therein for production of the holding quality, substantially as would have been the case, had the clamp sections with their semicircular recesses been of the exact size to meet the cable diameter. In FIGURE 15, which is a fragmentary section through the proximate portions of one of the clamp sections, and the cable, the wrapped tape is identified by the numeral 50. Its original wrapped contour was the circular cylinder defining the cable surface; but the tightening of the sections together has embedded the tape into the yieldable cable sheath sufficiently to receive the ribs of the clamp, and the tape, into cable sheath depressions as shown at 51 in FIGURE 15.

By use of the technique defined above it is evident that the desired gripping effect may be produced by clamps of a specified size, when applied to cables having diameters varying between upper and lower limits sufficient to meet all cable size requirements within acceptable diameter variations, commercially.

It is also to be noted that when using the technique above defined, the ribs of the semi-circular recesses of the sections should be tapered as shown in FIGURE 15, to accommodate the tape thickness between the proximate rib walls and the deformed surface portions of the cable sheath. Under the conditions produced by such application of the wrapped fine filament tape, when such tape is applied only to the extent proper to bring the external diameter of the cable to the intended diameter of use of the clamp sections, the clamping bolts 38 and 39 may be tightened sufficiently to bring the diametral surfaces of the two clamp sections into dead engagement with each other; thus ensuring the intended gripping force between the clamp and the cable, without danger of injuring the cable sheath, but with assurance that the intended gripping action has been produced.

A cylindrical cup shaped element 42 is set over the end portion of the cable during the assembling operation, such element 42 being provided with a central opening 43 in its floor 44. The flange 45 of this element 42 is externally threaded to engage with the internal threads formed in the end portion of the tubular element 20. The inner end of such flange 45 constitutes an abutment which will bear against the clamp block during the assembling operation. To this end the surface of the clamp block, and the proximate edge of the flange 45 are formed within planes normal to the axis of the structure. Such engaged condition is shown in FIGURE 2. It is also noted that the internal diameter of that portion of the tubular element leftwardly of the shoulder 32, and also the internal diameter of the internal threading of the end portion of such tubular element, are both large enough to accommodate the clamp unit in case such unit should be moved far enough rightwardly by the element 42, to require such accommodation. It is also noted here that the volume of the space between the clamp element and the disk element 35 may be materially reduced by forcing the clamp element rightwardly by use of the cup element 42. Also, that all forces developed by such operations are internal to the tubular element 20 and the cup element 42, since these elements are in direct engagement with each other, and the disk 35 is engaged against the leftwardly facing shoulder 32. Accordingly, any desired compression force to be developed within the space between the clamp element and the disk element, and encircled by the tubular element, is produced without tension on the cable to which the clamp element is gripped, other than such tension force as may be needed to drag the cable slightly further into the body of the splicer itself during the compression in producing operation, presently to be explained in detail.

It is noted that a slight clearance is provided between the perimeter of the disk 33 and the internal cylindrical surface of the tubular element, and also between the perimeter of the clamp element and such interior surface of the tubular element. These light clearances will be referred to hereinafter. It is also noted that in the embodiment shown in FIGURE 2, very slight clearances due to manufacturing tolerances, will occur between the surface of the inner sheath 29, of the cable, and the central opening of the disk 33, and between the clamp 34 and the outer surface of the cable sheath. Such latter clearance will, to all practical purposes, be extinguished during the clamping operation. When a wrap of filament, such as shown in FIGURE 15, presently to be described, is employed, such wrap will also ensure excellent sealing between the cable surface and the clamp unit. In the embodiment shown in FIGURE 13, a further relationship between various of the parts, is shown. This will be explained in detail hereinafter.

The outer end cup-shaped element floor 26, and the element 42 are both provided with central openings considerably larger than the cable, thus affording annular passages between the floors of both such elements, and the cable surface. A gasket unit 46 of the general form shown in FIGURE 2A is set on to the cable in the space between the two floors 26 and 44 of the two cup-shaped elements. This unit 46 is of double truncated conical form or section, its front or leading end portion comprising the truncated conical portion 47, and its following portion comprising the truncated conical portion 48. The bore 49 of this unit 46 is of size to receive the full diameter of the cable with a snug fit. The front or leading end of the portion 47 is of size smaller than the opening 43 of the element 42, so that during the assembling operation such smaller end may be started through such opening 43 to a position where the cone jambs into such opening. Thereafter when the outer element 21 is screwed on to the end portion of the tubular element 20, the cone portion 48 will be received into the opening 27 of such element 21. As the cup element 21 is threaded home during the assembling operation, the cone 48, acting as an abutment, will drive the unit 46 tighter and tighter against the floor 44 of the element 42, thus driving the conical portion 47 into very tight engagement with the opening in such floor 44. It is evident that, due to the steep pitch of the abutment provided by the conical portion 48 of such unit 46, a large axial component of force may be produced against such unit 46, serving to drive its conical portion 47 into the opening 43 of the element 42. Also, due to the small conical angle of such portion 47, there will be developed a large radial component of force inwardly, producing a strong engagement of such conical portion against the cable surface, at the location of the floor 44, where further sealing action against the ingress of moisture will thus be further prohibited.

It is here noted that in the fragmentary longitudinal section 16, through the engaging portions of the unit 21 and the proximate end portion of the tubular element 20, the companion threaded portions are cylindrical instead of being tapered, so that cylindrical threading is available. Such a structural arrangement, when used at the location in question, will be of advantage, since thereby no limitation is produced to the amount by which the unit 21 may be threaded on to the tubular element, other than the distance to which the parts have been threaded; thus such unit 21 may be certainly screwed onto the tubular element far enough to ensure the desired clamping of the unit 46 radially against the cable surface. On the other hand, when using the tapered threading shown in FIGURE 2, it might happen that the extent of threading operation available between the parts would limit the threading movement of the unit 21, prior to such time as the desired clamping of the unit against the cable, had arrived. The use of the one or the other form of threading is thus optional, and may depend on other functions than just above referred to.

Although the inward driving produced by the screwing of the cap element 21 into its final position, produces a high degree of compression of the unit 46 against the cable, enhanced by the easy angle of the conical section 47, still a very considerable compressive force is also developed between the cable surface and the steeper conical surface 48, so that considerable degree of compression of the material of such unit 46 is produced at the location of the floor 26. Thus all parts of the engagement of such unit 46 with the cable ensure compression of such unit, with development of a high degree of resistance to further compression of such unit 46 radially inwardly, towards the cable axis. Thus such unit 46, being under a high degree of compression, will be highly resistant to further deformation in any radial direction. Accordingly, any bending force exerted on the cable from outside of the splicer, urging bend of the cable at the location of the clamp element 34, will be effectively resisted. The cable will thus be retained in its straight condition in that space between the opening 27 and the location of the clamp 34. Thus, the swinging and swaying of the cable after installation, will not cause deflecting movements to be transmitted to the cable area adjacent to such clamp. Deleterious effects which might be produced by such deflecting movements, are thus effectively avoided.

When the cable, including the splicer thus far described, is placed under tension due to tension in the arriving and departing cable sections, provision must be made for protecting the spliced pairs within the splicer, from tension. Examining the structure so far described, it will be seen that forces of tension between the cables, shown at 22 and 23 in FIGURE 1, are transmitted directly through the splicer in the following sequence; Cable 22 to the clamp unit on that cable, thence to the cup-shaped element 42 of the splicer, and thence directly to the tubular element 20 of the splicer. From that element such forces are transmitted in reverse sequence through the corresponding elements at the other end of the splicer, to the departing cable 23. Accordingly, such tensile forces are not transmitted to the sealing unit contained within the compartment defined by the clamp unit 34, the disk 33, the stripped portion of the cable (and any unstripped portion thereof exposed with such compartment), and the inner surface of the tubular element 20. No deleterious force may be transmitted into such compartment which might affect the quality or the effectiveness of such sealing unit, it being noted that the only possibility of disturbance to such sealing unit within the compartment would be due to stretch of the tubular element 20, in the short portion thereof between the clamp 34 and the disk 33. Such stretch would be extremely small in any case.

In the foregoing description I have made reference to the details of FIGURES 13, 14, 15 and 16. The following further description of such figures is proper.

In FIGURE 13 the clamping unit 34 is shown engaged with the cable section 28 (unstripped), and the disk 33ª is shown, with its central opening 52 through which the cable (or that portion thereof which has been stripped of the outer sheath of the cable) passes into the splaying area. At this point it is pointed out that conventional telecommunications cables conventionally include, between the outer sheath and the pairs, and such other elements as insulation, a wrapping of thin sheet conductor which extends the full length of each cable section (between splicers), and that such conductors for the successive cable sections are connected together, to provide a continuous protective layer of conducting material, outside of the pairs of communications conductors, and within the outer sheath. Such conductors of the successive cable sections are electrically joined together by straps extending through the tubular central portion of the splicer, and connected to the protective conductors of such cable sections. Conventionally, such protective conductor sheets are corrugated, and provided with end extensions or tabs by which they may be readily connected to the strap extending through the body of the splicer. Provision has been made for enabling such protective conductor sheets of the successive cable sections to be joined together, in the structures herein disclosed. Such provision is as follows, reference being made to the fragmentary section of FIGURE 13:

The stripping of the end portion of the cable is of sufficient length to extend through the central opening 52 of the disk 33a, which central opening is made of size sufficient to accommodate the so-stripped cable end portion. The shield 53 (shown only at the top of the stripped portion 29a) is carried through the opening 52 to provide the tab 54, previously referred to. Conveniently, during the operations of splicing, such shield is torn away from the stripped portion of the cable, leaving only the narrow strip shown in FIGURE 13, which then extends through the opening 52 to provide the tab, as above stated. In FIGURE 13 I have shown a layer of material 55 over the stripped end portion of the cable, on which layer such tab is shown. This layer 55 will be further referred to hereinafter. Examination of FIGURE 13 will also show that the opening 52 is of size to leave a slight clearance around the stripped cable end (including such layer 55). This may be done to enable the readier assembly of the splicer elements; but such annular opening will be effectively closed and sealed in gas-tight manner by the sealing body and the operation thereon produced within the compartment defined by the clamp, the disk, and the tubular element 21, to produce the desired sealing of the cable end portion, without destroying the continuity of the air channel through the core of spliced pairs. Such compartment is therefore filled with the sealing agent during the assembling operations, and such sealing agent is then placed under considerable compression. These operations include the following:

In FIGURES 2 and 13, the body of sealing agent is identified by the numeral 56 (FIGURE 2) or 56a (FIGURE 13). This body comprises deformable, insulating, water-proof, gas and air-tight, substantially permanent (chemically) material, in the nature of a plastic, having the further qualities of high internal molecular resistance, substantially non-elastic, yieldable or deformable under compressive force, of very high viscosity but capable of compressive drive into small interstices to produce sealing thereof, and having the characteristic of small change of such qualities during substantial temperature changes above and below the normal temperature of 70 degrees F. The material also includes the quality of extreme self-stickiness—that is, when one body or portion of the material is brought into contact with another body or portion of the same material, such two bodies or portions become substantially integral, to thus produce a substantially continuous mass of the material, the lines or areas of contact being substantially extinguished by such contact. This action is materially aggravated when the whole is placed under compression within a space which may be contracted in size to produce the compressive force. One such material comprises a polyisobutylene, having a Saybolt Universal Viscosity of 3000 seconds at 200 degrees F. Such material is widely known in the arts, and is obtainable from various sources of supply.

Such materials as defined above are obtainable in the form of strips or tapes of various widths, such strips being conveniently supplied in the form of rolls, with a strip of other form of tape rolled into the spool, to prevent adherence of the proximate convolutions of the polyisobutylene together, such inter-rolled strip being non-adherent to the polyisobutylene strip. Such strip of sealing material may be obtained in the roll form, of width substantially the same as the axial distance between the proximate faces of the clamp unit and of the disk 33 (or 33a). Thus it is possible to produce a body of such sealing material 55 or 55a within the compression compartment, by starting to wrap the strip from the roll, at the surface of the cable (stripped or un-stripped) within the compartment, and producing wraps until the body of sealing material has been built up to a diameter substantially the same as that of the clamp 34. The strip may then be cut off, leaving the now substantially integral body of the sealing material in place within the compartment. Such wraps of the strip are shown schematically in FIGURES 2 and 13 by the lines extending through the sectioned body, parallel to the axis of the cable.

When there is an offset of diameter of the cable within the compartment, due to stripping the outer sheath, or otherwise, as shown in both of FIGURES 2 and 13, the first convolution or more than one, may be of width to meet the special requirements of that portion of the operation.

In the alternative embodiment shown in FIGURE 13, the cable material has been stripped down only to the location of the shield 53, leaving the cable portion 55 in place, out to the diameter of the shield. In some cases such cable material between the core of pairs, and the shield, may also be removed in preparation for formation of the sealing material body. In such case the narrow strip of shield producing the tab may be folded up into a more or less radial position, close to the shoulder 57 (FIGURE 2) or 57a (FIGURE 13). Then, with such tab in its raised position, the wrapping of the sealing strip (of width equal to the distance between the faces of the clamp and the disk) may be produced out to the diameter at which the tab commences, and the tab may then be folded down onto the surface of such so-wrapped strip. Thereafter the strip of full width may be wrapped over the tab, and wrapping may be continued to the desired diameter already defined.

Having thus produced the body of sealing material in the compartment, substantially filling the same, at hte proper stage of the operations, the clamp may be advanced forcibly against the proximate surface of the body of sealing material, by screwing the unit 42 in direction proper to approach the disk. By screwing the unit 42 further towards the disk 33 or 33a, the body of sealing material will be placed under such degree of compression as will deform it into strong engagement with all of the proximate surface areas of the compartment, and further advance of the unit 42 will cause the sealing material to also intrude into cracks or small openings such as the thin annular clearances between the periphery of the clamp unit and of the disk, and the inner surface of the tubular element; and also into any crack between the cable surface and the opening through such disk. In the case of the modified embodiment shown in FIGURE 13, such sealing material will also be deformed into any annular space between the partially unsheathed cable and the tab, and the opening through the disk. Such sealing action will also be produced against the unsheathed, exposed end of the outer sheath of the cable, being the locations 57 and 57a in FIGURES 2 and 13, respectively.

It is noted that when the sealing operation has been completed as outlined above, no portion of the sealing material has been intruded into the core of the cable (containing the pairs of conductors), and that such core remains fully exposed to the space beyond the disk and into the area where the pairs are spliced together. Thus free channel condition is retained for movement of the compressed air within the cable, under drive from a pumping station, into the space within the tubular element beyond the disk, when a compressed air operation is employed.

I have previously referred to the production of the structural elements of the splicer from plastic or other non-electrically conducting material. Conveniently all of the parts including the tubular element 20, the outer cap or cup 21, or 21ᵃ, the cup 42, the clamp sections 35 and 36, and the disk 33 or 33ᵃ, are molded, and such material as polyvinyl chloride may be used for such elements of structure. Such material of the rigid type, consisting of the homopolymer, the copolymer, or the poly-blends comprise tough, strong, thermoplastic materials, are substantially non-combustible, and resistant to chemical actions. When it is desired that the splicer parts be better adapted to resist impacts, as well as being possessed of hardness and strength, blends of small amounts of rubbery materials such as the copolymer of butadiene and acrylonitrile, may be incorporated in the material. Very smooth and polished surfaces may be obtained in the production of such parts; and the molding operations may be such as to produce the units to very close tolerances without need of after-molding operations, such as machining. However, it may be desirable to bore the cylindrical surface 58 of the sealing material compartment, as a finishing operation, producing thereon a slightly roughened surface in such area.

The splicers embodying the features of the present invention may, on occasion, be opened for the purpose of repairing damaged pairs or other parts, due to lightning stroke or otherwise. Such an opening operation will of necessity be accompanied by disturbance of the sealing body within its compartment, or to the disk, the cylindrical element, or other parts. The polyisobutylene material is highly self-adherent, that is, one body of such material will adhere to another body of the same material, with an adherence substantially equal to integration of such two bodies together. However, such material has but small adherence in tension to such materials as polyvinyl chloride, although it does have a very considerable adherence to such polyvinyl chloride against shear. Accordingly, to produce the operations needed for entrance to the body of the splicer where the individual lines are spliced, the following operations may be performed:

A suitable spanner wrench or like tool may be connected to the blocks comprising the clamp unit (the corresponding end cap 21, the gasket unit 46, and the unit 42 having first been removed), and the clamp unit, connected to the proper tool (such such as a form of spanner wrench) may be withdrawn from its engagement with the sealing body within the compartment. This latter operation is possible, due to the fact that the adhesiveness of such body of sealing material is less powerful than the adhesiveness of such body to the inner surface of the end portion of the tubular element 20, especially when such portion of said tubular inner surface has been machined, as previously explained. Having withdrawn the clamp unit according to the operations above defined, far enough to expose the clamp unit outside of the tubular unit 20, the bolts or screws 38 and 39 may be removed, thus permitting the two sections of the clamp unit to be separated from each other and from the cable, making it possible to gain access to the elements within the body of the tubular element, including the sealing material body and the disk 33.

During this operation, the cable will also be withdrawn a distance corresponding to the withdrawing movement of the clamp unit, due to the fact that the clamp unit is still engaged with the cable. This operation may be produced, notwithstanding the highly adhesive grasp of the sealing material body with the enclosing areas of the polyvinyl chloride formed units, since such sealing material may be distorted during such operation by whatever pull may be needed to withdraw the cable while the clamp unit is still connected thereto. It will also be found that the cable sheaths which are engaged by the sealing material have a smaller adhesiveness under shear, than such shear adhesiveness to the polyvinyl chloride units.

Having thus withdrawn the parts above referred to, including the clamp sections, from the cable, the sealing material remaining within the end portion of the tubular element 20, and still attached to the withdrawn cable, and other parts, may be readily cut away to complete the opening of the end portion of the splicer in question. Both ends thereof may be opened by such operations, allowing free shift of the tubular element along one of the cable sections, to enable access to the complete body of the splicer.

Having made such repairs as needed, the splicer may again be re-assembled according to the disclosure previously made herein.

In the foregoing descriptions of structure and operations, I have frequently referred to the uses and conditions attending such uses of the splicers for plural-pair-telecommunication cables. It is also evident that splicers embodying all or various of the structural features herein disclosed, may well be used in splicers comprising portions of cable transmissions for other purposes. Such may include, by way of example, co-axial cables largely used for such purposes as transmission frequencies within the megacycle range, power transmitting cables, and various other cable types which will suggest themselves to the student of this specification.

The statements of various specific materials hereinbefore defined are to be construed broadly as defining materials having characteristics suitable for the structures herein disclosed; and I do not intend to limit myself to such specific materials, except as I do so in the claims to follow.

I claim:

1. Cable splicing means for receiving and protecting the proximate end portions of companion cable sections; comprising the combination with such companion cable sections of a central tubular section of internal size to receive and accommodate the spliced end portions of companion conductors of the cable sections; wherein said tubular section is formed at each end with an outwardly endwise facing internal shoulder constituting an abutment, a disk located within each such end portion of the tubular section and seated against such abutment at such tubular section end; a cable gripping clamp unit located within each such end portion of the tubular section outwardly away from the corresponding disk, including means constituted to cause such clamp unit to grip the outside surface of the cable section extending into the corresponding end of the tubular section; a through opening in each such disk, the proximate cable end portion extending through such clamp unit and through such disk opening, to the central portion of the tubular section, each such clamp unit and the corresponding disk and the outer surface of the cable between said clamp unit and such disk, together with the portion of the tubular section which encloses the space between such clamp unit and such disk comprising a sealing material compartment, a body of sealing material filling said compartment throughout the volume of said compartment, said sealing material comprising a solid material which is deformable under compression; and means within the end portion of the tubular section at a position proximate to the outwardly facing side of the corresponding clamp unit, movable while in engagement with such clamp unit, towards the corresponding disk, with corresponding reduction of the volume of the sealing material compartment, to compress said body of deformable material.

2. A structure as defined in claim 1; wherein the tubular section, the disk, and the clamp unit, comprise a polyvinyl chloride.

3. A structure as defined in claim 1; wherein the body of sealing material comprises a material which has a high internal molecular resistance, is deformable under compressive force, is substantially non-elastic, and is of high viscosity.

4. A structure as defined in claim 3; wherein the sealing material comprises polyisobutylene.

5. A structure as defined in claim 4; wherein the material of the sealing body includes the characteristic that it is highly self-adhesive, and the characteristic that when portions of such material contact with each other under compressive force a substantially integral body of the material is produced.

6. A structure as defined in claim 5; wherein the tubular section and other elements engageable with the body of sealing material, are composed of plastic materials.

7. A structure as defined in claim 6; wherein the plastic material is slightly adhesive to the material of the sealing body under tension, and is more strongly adhesive to the material of the sealing body under shear.

8. A structure as defined in claim 6; wherein the material of the tubular section and other elements engageable with the body of sealing material, comprises polyvinyl chloride.

9. A structure as defined in claim 1; wherein the cable includes an inner core comprising insulated conductors, together with an inner sheath, together with an outer sheath of yieldable, deformable, water-proof, gas and air-tight substantially permanent material; and wherein such outer sheath terminates at a location within the sealing material compartment with exposure of the inner sheath within such compartment; and wherein the sealing material within the compartment is engaged with the inner sheath within the compartment, including engagement of such sealing material with the outer sheath and the inner sheath at the location of termination of the outer sheath in the compartment.

10. A structure as defined in claim 9; wherein the means which is movable while in engagement with the clamp unit, exerts a compressive force against such clamp unit with production of bodily compressive force against the sealing material and throughout the body of such material.

11. A structure as defined in claim 10; wherein the sealing material has a high internal molecular resistance, is deformable under compressive force, is substantially non-elastic and is of high viscosity.

12. A structure as defined in claim 11; wherein the compressive force against the sealing material and throughout the body of such material produces intrusion of such material into sealing engagement with the locations proximate to the clamp unit and the disk, with the tubular section, the location of the opening in the disk accommodating the cable, and the location of the termination of the outer sheath within the sealing material compartment.

13. A cable splicer for receiving and protecting the proximate end portions of companion cable sections; comprising in combination a central tubular section of internal size to receive and accommodate the spliced ends of companion conductors of such cable sections; wherein said tubular section is formed at each end with an outwardly endwise facing internal shoulder constituting an abutment, a disk located within each end portion of the tubular section and seated against such abutment at such tubular section end; a clamp unit located within each end portion of the tubular section adapted to grip a cable outwardly away from the corresponding disk including means constituted to cause each such clamp unit to grip the outside surface when a cable section is extending into the splicer at the corresponding end of the tubular section; each clamp unit and the corresponding disk, together with the portion of the tubular section which encloses the space between such clamp unit and such disk, comprising a sealing material compartment of reduceable volume; means within each end portion of the tubular section at a position proximate to the outwardly facing side of the corresponding clamp unit, movable while in engagement with such clamp unit, towards the corresponding disk, with corresponding reduction of the volume of the sealing material compartment; wherein said means which is movable while in engagement with such clamp unit, towards the corresponding disk, comprises an element in threading engagement with the proximate portion of the tubular section, and provided with an opening of size greater than a cable adapted to extend through such opening and producing an annular opening clearance between such cable and such cup shaped element; together with a truncated shape gasket provided with an axial opening adapted to receive such cable in gripping engagement with such cable and with the smaller end portion of such gasket extended through the floor opening; and means to drive such gasket towards the said floor under pressure to effect compression of the gasket circumferentially against such cable.

14. A structure as defined in claim 13; wherein said gasket comprises a rubber-like material.

15. A structure as defined in claim 14; wherein the means to drive the gasket towards said floor under pressure, comprises a second cup shaped unit in threading engagement with the proximate end portion of the tubular section, and provided with an opening in the floor of such second cup shaped unit adapted to receive a cable, such opening being of size greater than such cable and producing an annular clearance between such cable and such floor; and wherein the gasket end portion farthest from the clamp unit is in driving engagement with the floor of such second cup shaped unit.

16. A structure as defined in claim 15; wherein the gasket includes a truncated conical end portion having the small end of such conical portion facing towards the splicer and entered into the floor opening of the second cup shaped unit which is in threading engagement with the tubular section; wherein driving force produced by the threading engagement of the cup shaped unit, with the tubular section produces driving force against the larger end portion of the gasket, to produce a radial compressive force of the gasket against such cable extending therethrough.

References Cited

UNITED STATES PATENTS 3,280,247  10/1966  Channell et al. _____ 174—93

DARRELL L. CLAY, *Primary Examiner.*